United States Patent
Baldauf et al.

(10) Patent No.: US 7,293,556 B2
(45) Date of Patent: Nov. 13, 2007

(54) METHOD OF CONTROLLING THE INJECTION BEGIN OF A FUEL INJECTION VALVE OF AN INTERNAL COMBUSTION ENGINE

(75) Inventors: Johannes Baldauf, Wangen (DE); Jörg Remele, Hagnau (DE); Michael Eckstein, Immenstaad (DE); Christian Rehm, Friedrichshafen (DE); Martin Schönle, Friedrichshafen (DE); Johannes Kech, Ravensburg (DE); Andreas Kunz, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/541,877

(22) Filed: Oct. 2, 2006

(65) Prior Publication Data

US 2007/0023010 A1    Feb. 1, 2007

Related U.S. Application Data

(63) Continuation-in-part of application No. PCT/EP2005/003555, filed on Apr. 5, 2005.

(51) Int. Cl.
*F02D 41/10* (2006.01)
(52) U.S. Cl. .................. 123/681; 123/682; 123/492
(58) Field of Classification Search ........... 123/492, 123/493, 681, 682; 701/105
See application file for complete search history.

(56) References Cited

U.S. PATENT DOCUMENTS

| | | | |
|---|---|---|---|
| 4,476,837 A | 10/1984 | Salzgeber | |
| 5,319,558 A * | 6/1994 | Nemoto et al. | 123/492 |
| 6,302,082 B1 | 10/2001 | Nagatani | |
| 6,305,358 B1 | 10/2001 | Lukich | |
| 6,397,821 B1 | 6/2002 | Spaegele | |
| 6,536,414 B2 * | 3/2003 | Hasegawa et al. | 123/492 |
| 2002/0011237 A1 | 1/2002 | Yomogida | |
| 2004/0122582 A1 * | 6/2004 | Katoh et al. | 701/105 |

FOREIGN PATENT DOCUMENTS

| | | |
|---|---|---|
| DE | 689 05 482 | 2/1991 |
| DE | 196 46 942 A1 | 5/1998 |
| DE | 197 40 527 | 3/1999 |
| DE | 101 48 651 C1 | 3/2003 |
| DE | 102 15 406 | 10/2003 |
| DE | 103 21 192 | 12/2004 |

* cited by examiner

*Primary Examiner*—Erick Solis
(74) *Attorney, Agent, or Firm*—Klaus J. Bach

(57) ABSTRACT

In a method of controlling an internal combustion engine wherein an injection begin is calculated depending at least on an actual engine speed and the injection begin is corrected, the injection begin correction is calculated from a deviation of a desired air mass flow from an actual air mass flow.

7 Claims, 4 Drawing Sheets

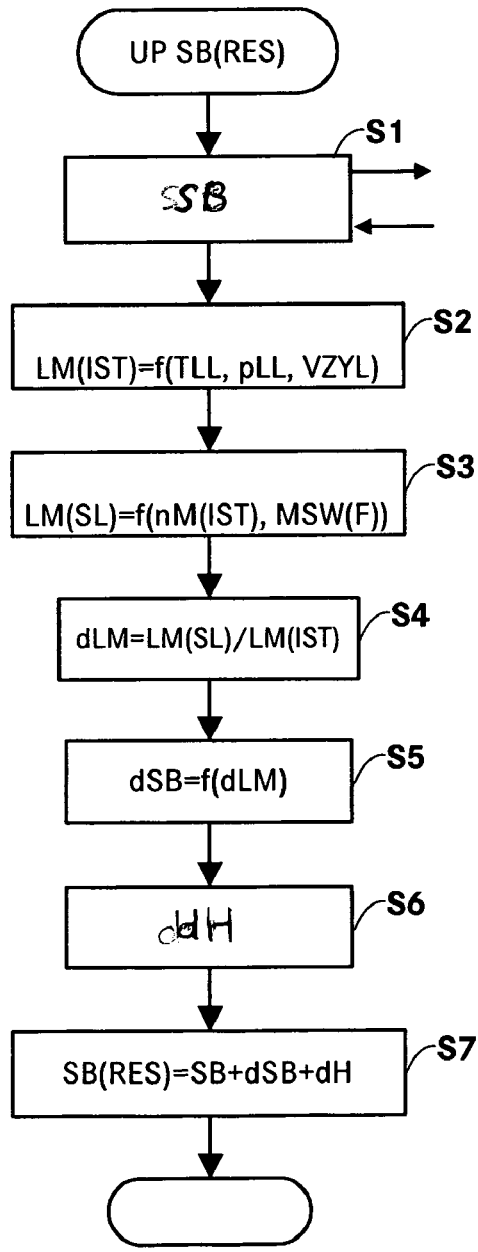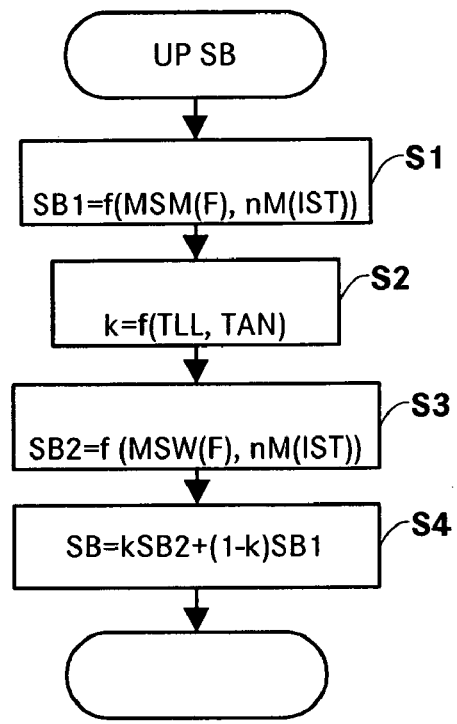
Fig. 4
Fig. 5

METHOD OF CONTROLLING THE INJECTION BEGIN OF A FUEL INJECTION VALVE OF AN INTERNAL COMBUSTION ENGINE

This is a Continuation-in-Part Application of International Application PCT/EP2005/003555 filed Apr. 5, 2005 and claiming the priority of German Application 10 2004 017 052.5 filed Apr. 7, 2004.

BACKGROUND OF THE INVENTION

The invention resides in a method of controlling an internal combustion engine wherein a fuel injection begin is calculated on the basis of a momentary engine speed, and a correction value for the injection begin and a corrected fuel injection begin are determined for the control of the internal combustion engine.

In an internal combustion engine, the fuel injection begin, the injected fuel amount and the fuel injection end determine to a large extent the quality of the combustion and the composition of the exhaust gases. In order not to exceed the legal limits, these characteristic values are generally monitored and controlled by an electronic control unit. Particularly critical in this connection are the transitions from a stationary to a non-stationary operating state, for example, the addition of a load or the change from one constant speed value to a higher speed value.

DE 199 139 C1 discloses a method of controlling an internal combustion engine wherein the speed of the internal combustion engine is monitored in a speed-control circuit and, upon detection of a significant change in the load at the engine output, the injection begin is retarded. As a significant change in load for example the emersion of a ship propeller from the water, or, in a power generator, the disconnection of a load are mentioned.

DE 44 46 246 C2 discloses a method for the control of a load acceptance behavior and the acceleration behavior of an internal combustion engine with exhaust gas turbochargers. In this method, upon recognizing a load increase, the speed is controlled and, additionally, the fuel injection begin is advanced. The adjustment in this case is dependent on the cylinder pressure or a charge air pressure of an exhaust gas turbocharger. The method however is complicated to adjust and designed only for non-stationary operating conditions.

DE 199 08 726 C2 also discloses a method of controlling an internal combustion engine wherein an injection begin is calculated by way of a performance graph at least dependent on the actual engine speed. For improving the operating smoothness, additionally, a corrective injection begin is calculated. The control of the internal combustion engine occurs on the basis of a resulting injection begin which is formed from the injection begin and the injection begin correction. However, the method described therein is only conditionally usable in connection with a diesel engine.

It is the object of the present invention to provide a method of controlling an internal combustion engine, particularly a diesel engine which is easy to tune and takes the various operating conditions of the internal combustion engine appropriately into consideration.

SUMMARY OF THE INVENTION

In a method of controlling an internal combustion engine wherein an injection begin is calculated depending at least on an actual engine speed and the injection begin is corrected, the injection begin correction is calculated from a deviation of a desired air mass flow from an actual air mass flow.

Instead of the desired torque, alternatively, a filtered desired torque may be used. In calculating the desired air mass, an operating state of the exhaust gas turbocharger such as a single charger or multi-charger operation is also considered.

The advantages of the invention reside in the fact that air mass deviations, for example, resulting from a clogged air filter or a defective waste gate can be specifically reacted upon. For example, a defective waste gate results in an excessive charge air volume. With the method according to the invention as a reaction, the injection begin is retarded. As a result, the operational safety is substantially improved. During non-stationary operation additionally, the exhaust gas and load acceptance behavior are improved.

In a particular embodiment of the invention for a cold internal combustion engine, the injection begin is calculated by way of a first performance graph. For an engine at operating temperature, the injection begin is calculated by way of a second performance graph. During a transition from a cold to an operationally warm engine operation, the injection begin is calculated in accordance with a transition function. With this embodiment, a more harmonic transition and consequently improved emission values are obtained.

The invention will become more readily apparent from the following description of a preferred embodiment thereof on the basis of the accompanying drawings.

BRIEF DESCRIPTION OF THE DRAWINGS

FIG. 4 shows a program execution of a subprogram,
and
FIG. 5 shows a program execution of another subprogram.

DESCRIPTION OF THE PREFERRED EMBODIMENT

Figure 1:
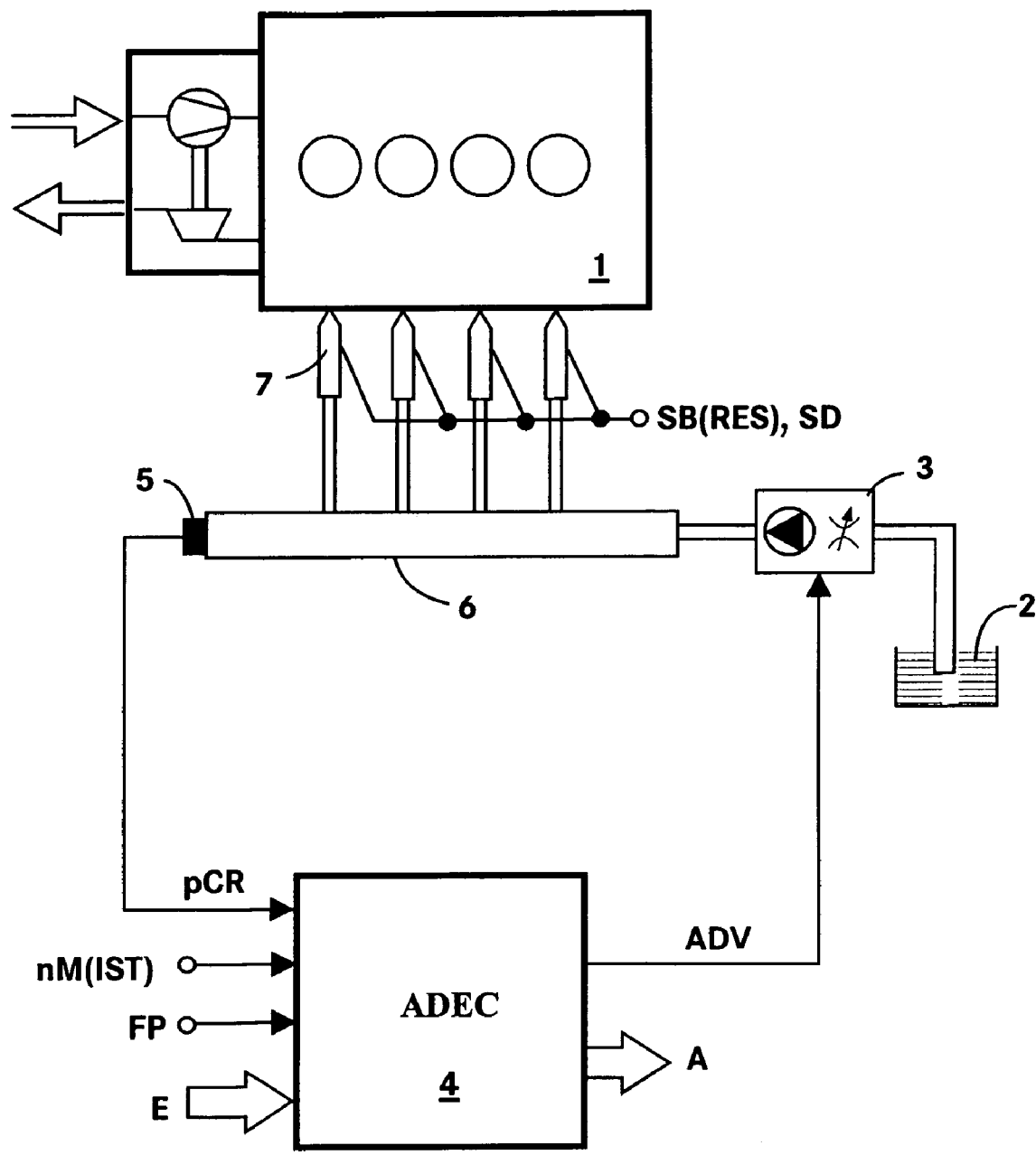
FIG. 1 shows a fuel injection system in principle.

FIG. 1 shows an internal combustion engine 1 with a fuel injection system provided with an electronic control unit 4. In the internal combustion engine 1 shown, the fuel is injected via a common rail fuel injection system, which comprises the following components: Pumps 3 with a suction throttle for pumping fuel from a fuel tank 2, a rail 6 for storing the fuel and injectors 7 for injecting fuel from the rail 6 into the combustion chambers of the internal combustion engine 1. Instead of the common rail 6, an individual storage may be provided for each injector 7.

The operation of the internal combustion engine is controlled by the electronic control unit 4 (ADEC). The electronic control unit 4 includes the usual components of a microcomputer system, such a microprocessor, I/O components, buffer and storage components (EE PROM, RAM). In the storage components, the operating data relevant for the operation of the internal combustion engine are stored in performance/characteristic graphs. By way of the performance/characteristic graphs, the electronic control unit 4 calculates from the input values the output values. In FIG. 1, the following values are shown as examples: An actual rail pressure pCR, which is determined by means of a rail pressure sensor 5, an actual speed nM(IST) of the internal combustion engine 1, a signal FP for setting the desired power output of the engine by the operator and an input value E. The input value E comprises for example summarily the charge air pressure of the turbocharger, an intake air temperature and the temperature of the coolant, the lubricant and the fuel.

In FIG. 1, as output values of the electronic control unit 4, a signal ADV for controlling the suction throttle and an output value A are shown. The output value A stands representative for the additional control signals for controlling the internal combustion engine 1, for example a resulting injection begin (SB(RES) and an injection duration SD.

Figure 2:
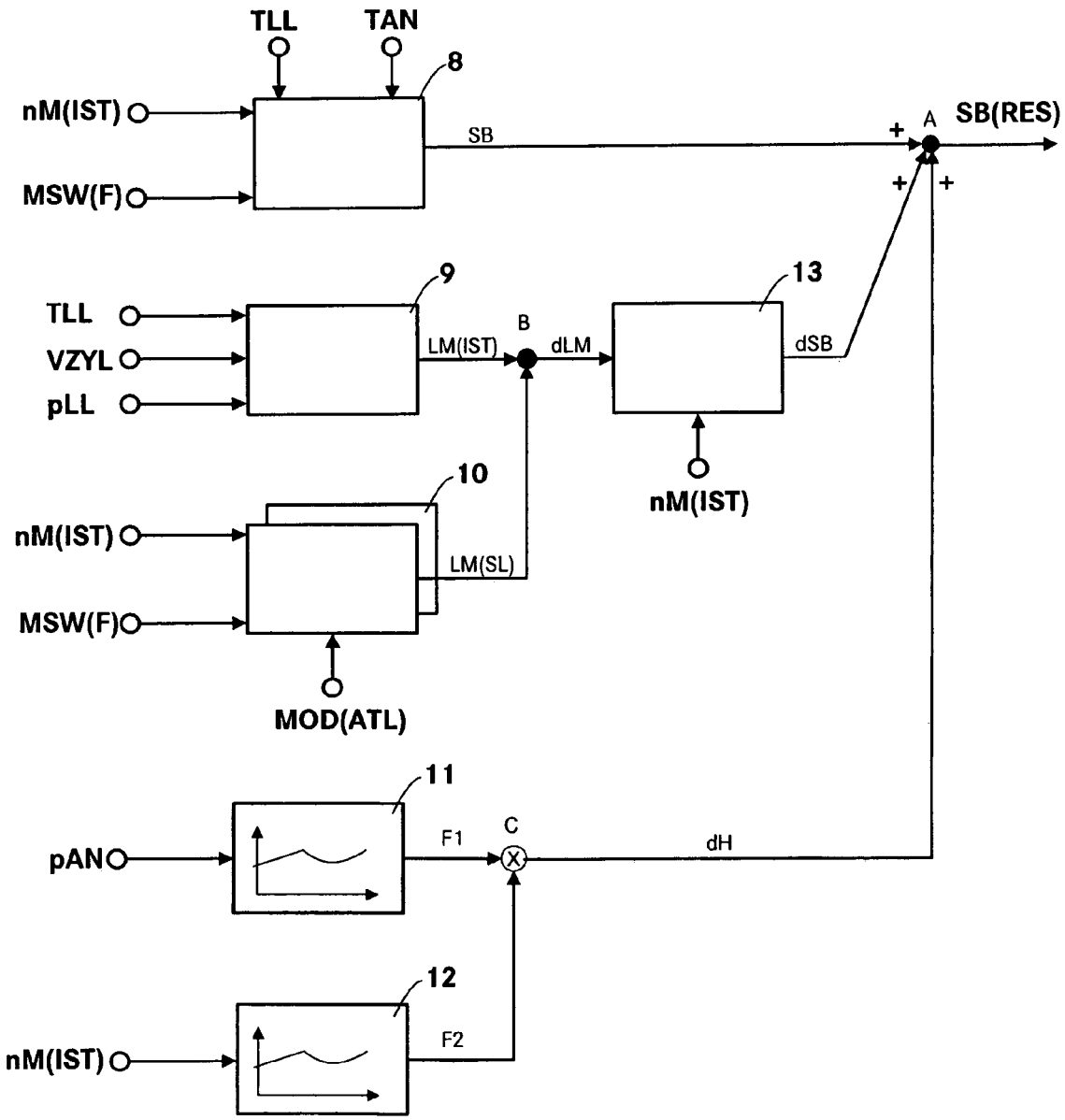
FIG. 2 shows a block diagram for calculating the resulting injection begin.

FIG. 2 shows a block diagram for calculating the resulting injection begin SB(RES). The resulting injection begin SB(RES) is calculated essentially from the injection begin SB and an injection begin correction dSB. The injection begin SB is determined by calculating the injection begin 8. The input values are the actual engine speed nM(IST), a desired torque MSW, alternatively a filtered desired torque MSW(F), a charge air temperature TLL and an intake air temperature TAN. As an alternative to the charge air and intake air temperatures, a coolant and oil temperature may be used. The calculation of the injection begin SB is explained in connection with FIG. 3. The calculation of the injection begin correction dSB is obtained via a calculation 13 from the deviation dLM of a desired air mass LM(SL) from an actual air mass LM(IST), point B. The actual air mass LM(IST) is determined by way of a calculation 9 using the gas equation from the charge air temperature TLL, a charge air pressure pLL and the cylinder volume VZYL. The desired air mass LM(SL) is calculated by way of a performance graph 10 from the actual speed nM(IST) and the desired torque MSW or, in the alternative, from the filtered desired torque MSW(F). Depending on an operating condition of the exhaust gas turbocharger MOD(ATL), a first performance graph 10 or other performance graphs 10 can be selected. Under operating condition of the turbocharger, a single charger operation or a multi-charger operation is to be understood.

As a supplemental feature in FIG. 2, a so-called altitude correction dH is indicated. Herewith, from the ambient pressure pAN, a value F1 is calculated by way of a performance graph 11. The value F1 is multiplied at the location C by a value F2. The value F2 is determined from the actual speed nM(IST) by way of the performance graph 12. The result corresponds to the altitude correction dH, which value can be added to the resulting injection begin SB(RES) at a point A.

The block diagram of FIG. 2 has the following functions:

From the air mass deviation dLM, a deviation from the normal state can be detected. The normal state is obtained by the manufacturer of the internal combustion engine during laboratory tests, for example, at an ambient temperature of 25° C., a constant actual speed and load and an ambient pressure of 1013 hectopascals. A deviation can be caused by a clogged air filter or a defective waste gate. A defective waste gate causes an excessive charge air volume. As a reaction hereto, the resulting injection begin (SB(RES)) is retarded. Also, a deviation of the air mass may occur during non-stationary operating conditions.

Figure 3:
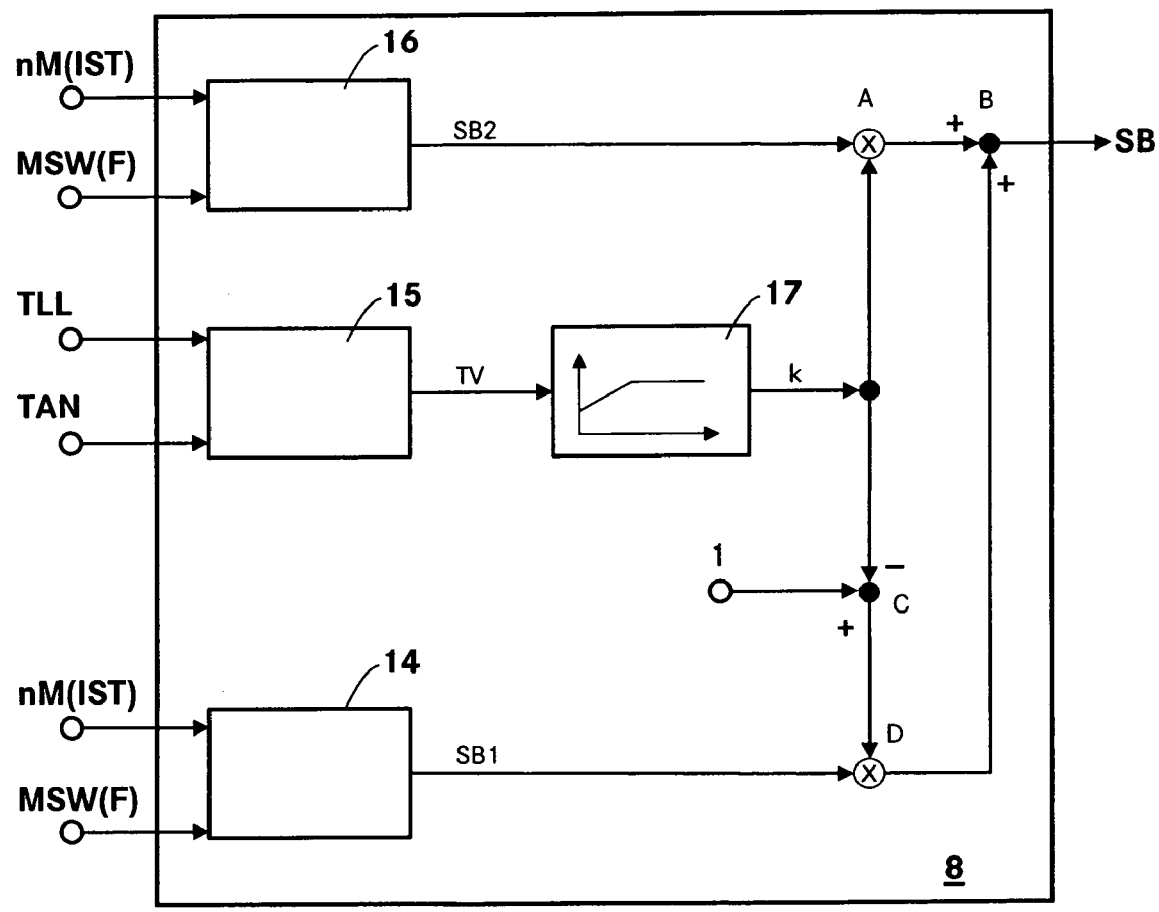
FIG. 3 shows a block diagram for calculating the injection begin.

In FIG. 3, the computation arrangement 8 for calculating the injection begin SB is shown. Herein, essential elements are a first performance graph 14 for calculating a first injection begin SB1, a second performance graph 16 for calculating a second injection begin SB2 and a signal path for determining a value k. The input values of the first performance graph 14 and the second performance graph 16 are identical. They correspond to the actual speed nM(IST) and the desired torque MSW or, alternatively, the filtered desired torque MSW(F). The first performance graph 14 is used when the engine is still cold for example at a temperature of less than zero degrees C. The second performance graph 16 is used when the engine is at operating temperature, for example, above 25° C. From the charge air temperature TLL and the intake air temperature TAN, by a calculation 15, a virtual temperature TV is determined from which again, by way of a performance graph 17, the value k is provided. Instead of the charge air temperature TLL and the intake air temperature TAN, alternatively, also the coolant temperature and the oil temperature may be used. The virtual temperature TV may be determined herein by means of a calculation rule which is known for example from the not pre-published German patent application DE 10 2004 001 913.4. The value k is multiplied by the second injection begin SB2 at a location A. At a point C, this value k is subtracted from the value 1 and the result is multiplied by the first injection begin at a point D. The result of this multiplication is added at a point B to the result of the multiplication at the point A. The result corresponds to the injection begin SB. The block diagram of FIG. 3 produces the following transition function:

$$SB = k \cdot SB2 + (1-k)SB1$$

wherein
SB=injection begin
k=factor
SB1=first injection begin
SB2=second injection begin This transition function determines the values for the injection begin during the transition from a cold to an operational warm state of the internal combustion engine.

FIG. 4 shows a flow chart for a subprogram for the calculation of the resulting injection begin (SB(RES)). At S1, the injection begin SB formed in a sub-program injection begin (FIG. 5) is read in. Then, at S2, the actual air mass LM(IST) is calculated by way of the gas equation from the charge air temperature TLL, the ambient pressure pLL and the cylinder volume VZYL. At S3, the desired air mass LM(SL) is calculated from the actual speed nM(IST) and the desired torque or, respectively, the filtered desired torque MSW(F). At S4, the desired air mass LM(SL) is compared with the actual air mass LM(IST), for example by a quotient formation. This provides for an air mass deviation dLM in percent. From this air mass deviation dLM, then an injection begin correction dSB is determined, S5. Additionally, at S6, an altitude correction dH may be calculated. At S7, the resulting injection begin correction dSB and the height correction dH. Then the procedure returns to the main program.

FIG. 5 shows a program flow chart for a subprogram for calculating the injection begin SB. At S1, the first injection begin SB1 corresponding to FIG. 3 is determined. At S2, the value k is calculated from the charge air temperature TLL and the intake air temperature TAN. In S3, the second injection begin SB2 is correspondingly calculated by way of the second performance graph 16 of FIG. 3. Then, at S4, the injection begin SB is calculated in accordance with the following relationship:

$$SB = k \cdot SB2 + (1-k)SB1$$

After the injection begin, SB has been calculated, the procedure returns to the subprogram of the resulting injection begin (SB(RES), here the step S1. The program cycle is then completed.

From the description of the invention, the following advantages are apparent:

A deviation of the air mass from normal amounts can clearly be recognized and can be taken into account by changing the resulting injection begin:

the efficiency of the internal combustion engine remains largely unchanged over the life of the engine;

the transition time during charger switch-over procedures is reduced the method is simple to implement and to time.

What is claimed is:

1. In a method of controlling an internal combustion engine (1) with common rail fuel injection comprising the steps of:

calculating a fuel injection begin (SB) depending at least on an actual engine speed (nM(IST)), calculating an injection begin correction (dSB) from a deviation (dLM) of a desired intake air mass flow (LM(SL) from an actual intake air mass flow (LM(IST)) and calculating from the injection begin (SB) and the injection begin correction (dSB) a resulting injection begin (SB(RES)) for controlling the internal combustion engine, the improvement, wherein the desired intake air mass flows (LM(SL)) is calculated depending on the actual engine speed (mM(IST)) and one of a desired engine torque (MSW) and a filtered desired engine torque (MSW(F)) and in the calculation of the desired intake air mass flow (LM(SL)) an operating state of an exhaust gas turbocharger MOD(ATL)) is taken into consideration in the form of a single charger operation or a multi-charger charger operation.

2. A method according to claim 1, wherein, in the calculation of the injection begin (dSB), the actual engine speed (nM(IST)) is taken into consideration.

3. A method according to claim 1, wherein, for an operationally cold engine (1), the injection begin (SB) is calculated via a first performance graph (14), for an operationally warm engine (1), the injection begin is calculated via a second performance graph (16) during a transition from an operationally cold to an operationally warm engine (1), the injection begin (SB) is calculated in accordance with a transition function.

4. A method to claim 1, wherein an altitude correction (dH) is provided in the correction of the fuel injection begin.

5. The method according to claim 1, wherein the deviation (dLM) of the desired intake air mass flow from an actual intake air mass flow (LN(IST)) is determined by the quotient of the desired air mass flow (LN(SL)) and the actual air mass flow (LM(IST)).

6. A method according to claim 3, wherein the injection begin (SO) is calculated in accordance with the following transition function:

$$SB = k \cdot SB2 + (1-k)SB1$$

wherein

SB=injection begin k=factor

SB1=cold engine fuel begin calculated by way of the first performance graph (14)

SB2=warm engine fuel injection begin calculated by way of the second performance graph (16).

7. A method according to claim 6, wherein the input values of the first performance graph (14) and the second performance graph (16) are based on the actual engine speed (nM(IST)) and one of the desired engine torque (MSW) and the filtered desired engine torque (MSW(F)).

* * * * *